United States Patent
Wei et al.

(10) Patent No.: US 7,809,824 B2
(45) Date of Patent: Oct. 5, 2010

(54) CLASSIFICATION AND CLUSTER ANALYSIS SPAM DETECTION AND REDUCTION

(75) Inventors: Stanley Wei, Palo Alto, CA (US);
Xiaopeng Xi, Fremont, CA (US);
Vishwanath Tumkur Ramarao, Sunnyvale, CA (US); Dragomir Yankov, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 13 days.

(21) Appl. No.: 12/240,708

(22) Filed: Sep. 29, 2008

(65) Prior Publication Data
US 2010/0082800 A1    Apr. 1, 2010

(51) Int. Cl.
*G06F 15/173* (2006.01)

(52) U.S. Cl. .................. 709/223; 709/206

(58) Field of Classification Search ............. 709/206, 709/223, 224
See application file for complete search history.

(56) References Cited

U.S. PATENT DOCUMENTS

| | | |
|---|---|---|
| 2003/0191969 A1* | 10/2003 | Katsikas .................. 713/201 |
| 2005/0183143 A1* | 8/2005 | Anderholm et al. ........... 726/22 |
| 2005/0203881 A1* | 9/2005 | Sakamoto et al. ............. 707/3 |
| 2008/0126951 A1* | 5/2008 | Sood et al. .................. 715/752 |

* cited by examiner

*Primary Examiner*—Frantz B Jean
(74) *Attorney, Agent, or Firm*—Weaver Austin Villeneuve & Sampson, LLP

(57) ABSTRACT

Multiple features of email traffic are analyzed and extracted. Feature vectors comprising the multiple features are created and cluster analysis is utilized to track spam generation even from dynamically changing or aliased IP addresses.

24 Claims, 6 Drawing Sheets

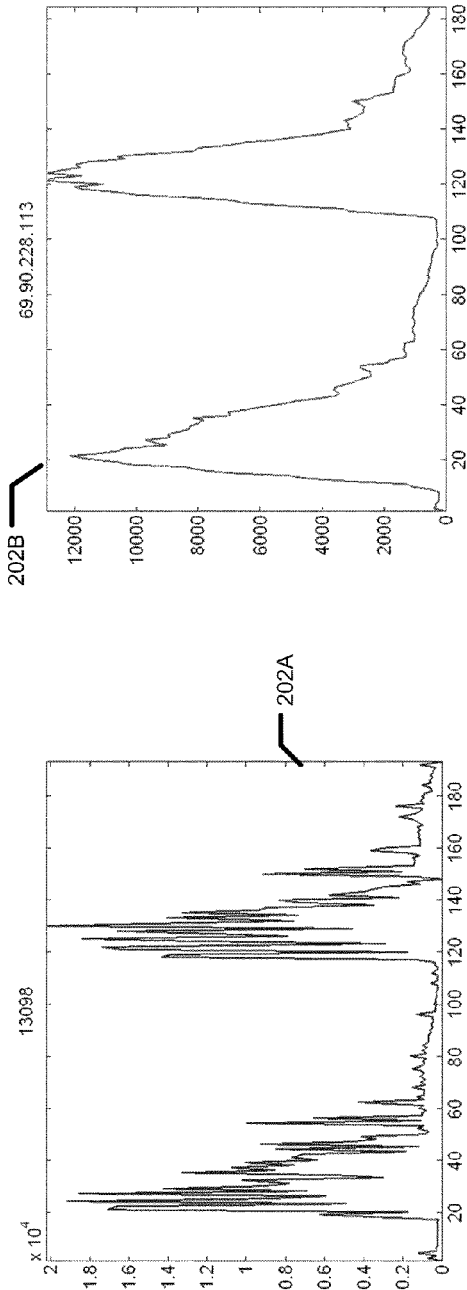
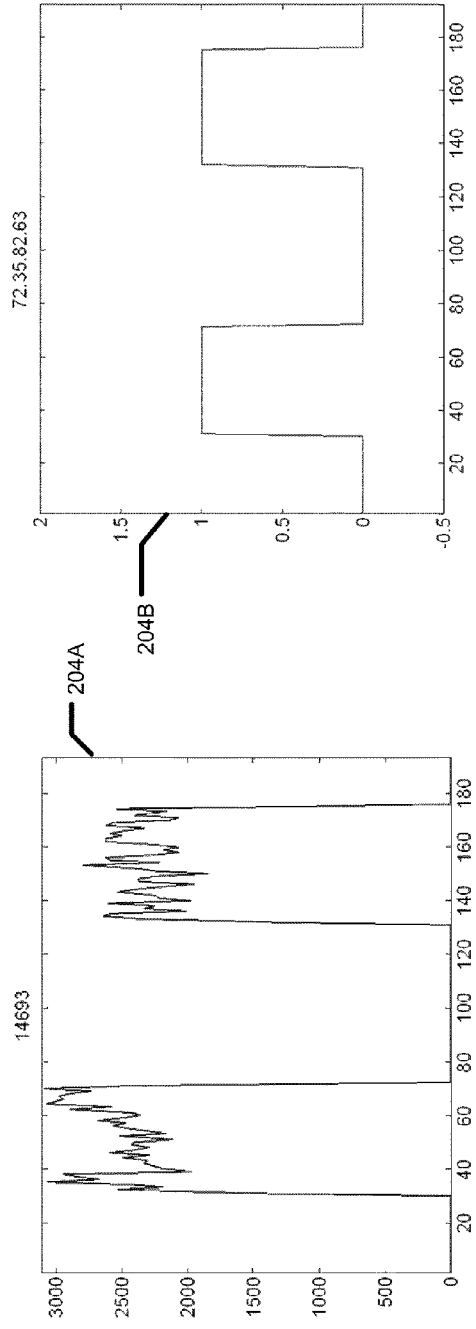
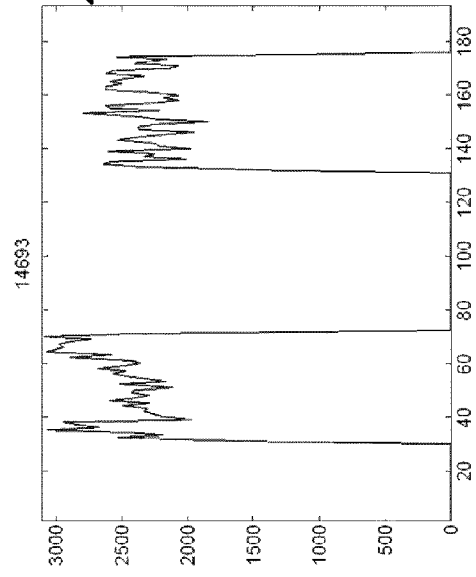
FIG. 2A
FIG. 2B
FIG. 2C
FIG. 2D

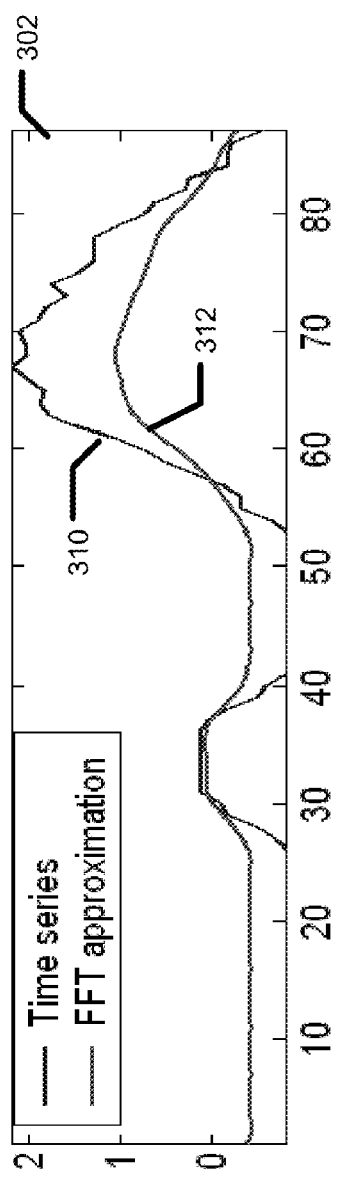

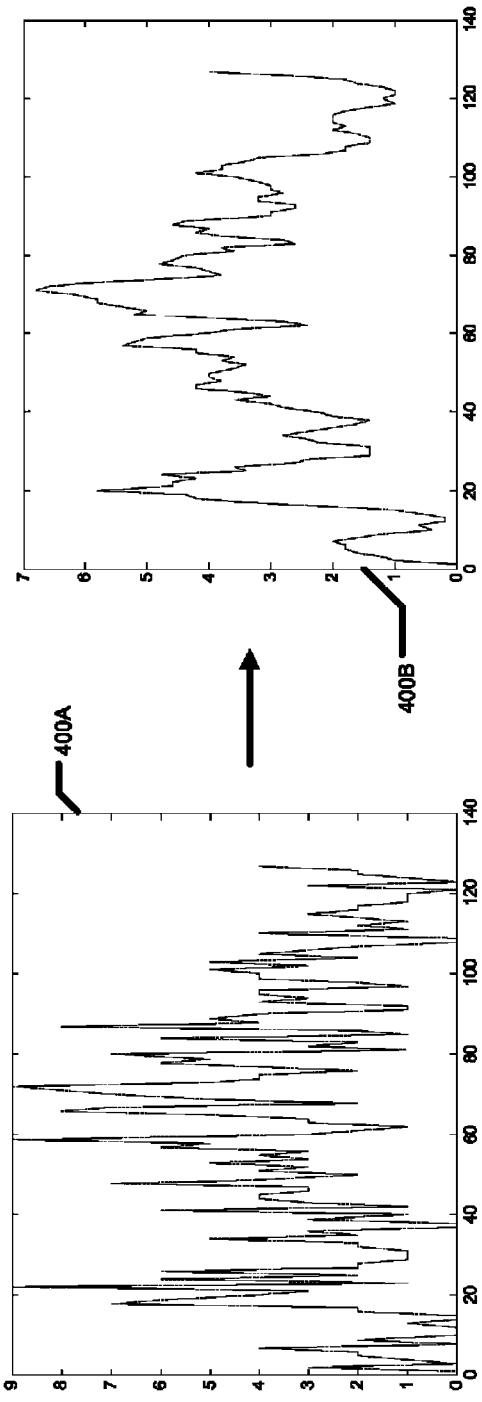
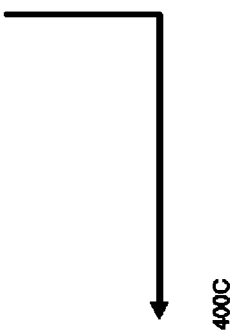
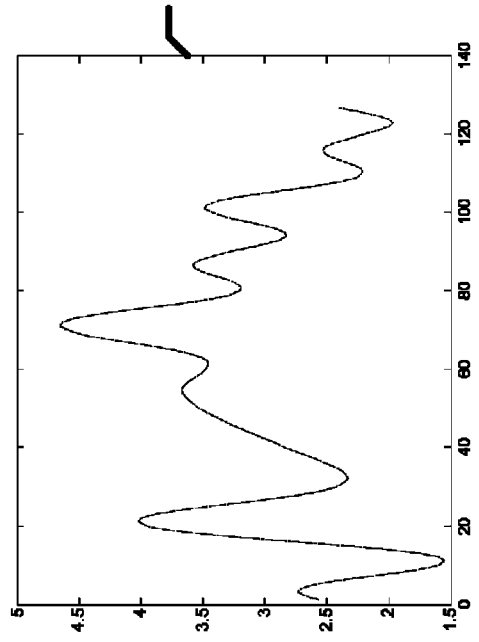
FIG. 4A
FIG. 4B
FIG. 4C

CLASSIFICATION AND CLUSTER ANALYSIS SPAM DETECTION AND REDUCTION

BACKGROUND OF THE INVENTION

This invention relates generally to email, and more specifically to minimizing the amount of spam traffic transported over an email system.

More than 75% of all email traffic on the internet is spam. To date, spam-blocking efforts have taken two main approaches: (1) content-based filtering and (2) IP-based blacklisting. Both of these techniques are losing their potency as spammers become more agile. Spammers evade IP-based blacklists with nimble use of the IP address space such as stealing IP addresses on the same local network. Dynamically assigned IP addresses together with virtually untraceable URL's make it increasingly more difficult to limit spam traffic. For example, services such as www.tinyurl.com take an input URL and create multiple alias URL's by hashing the input URL. The generated hash URL's all take a user back to the original site specified by the input URL. When a hashed URL is used to create an email or other account, it is very difficult to trace back as numerous hash functions can be used to create a diverse selection of URL's on the fly.

To make matters worse, as most spam is now being launched by bots, spammers can send a large volume of spam in aggregate while only sending a small volume of spam to any single domain from a given IP address. The "low" and "slow" spam sending pattern and the ease with which spammers can quickly change the IP addresses from which they are sending spam has rendered today's methods of blacklisting spamming IP addresses less effective than they once were.

SUMMARY OF THE INVENTION

Embodiments of the invention incorporate multi-feature classification, which complements existing techniques by categorizing spammers based on how they send email, rather than solely or primarily by the IP address from which they are sending it. The multi feature classification provides a more complete picture and more effective and tailored system for spam detection and limitation, and in some cases may replace a prior technique while in other scenarios it may be used in conjunction with and complement existing techniques.

In certain embodiments, once email sending patterns that are characteristic of spamming behavior are identified, an email system can continue to use an IP address as a basis of blocking spam even as spammers change IP addresses.

One class of embodiments relates to a computer-implemented method for managing email users and email traffic of an email system. The method comprises: collecting usage data of email traffic handled by the email system; generating time series data from the collected usage data; analyzing the time series data; analyzing geographic data of the usage data; analyze sending data of the usage data; analyzing content features of the email traffic; creating a plurality of feature vectors comprising indications of: the analyzed time series data, analyzed geographic data; and analyzed content features; and performing cluster analysis on the plurality of feature vectors and cluster groups of vectors into categories.

Another class of embodiments relates to an email delivery and management system. The system is configured to: collect usage data of email traffic handled by the email system; generate time series data from the collected usage data; analyze the time series data; analyze geographic data of the usage data; analyze sending data of the usage data; analyze content features of the email traffic; create a plurality of feature vectors comprising indications of: the analyzed time series data, analyzed geographic data; and analyzed content features; and perform cluster analysis on the plurality of feature vectors and cluster groups of vectors into categories.

A further understanding of the nature and advantages of the present invention may be realized by reference to the remaining portions of the specification and the drawings.

BRIEF DESCRIPTION OF THE DRAWINGS

FIG. 2A shows a graph 202A of volume over time, and FIG. 2B shows the data of FIG. 2A as a smoothed time series.

FIG. 2C illustrates an example of volume over time in graph 204A and graph 204B of FIG. 2D shows the same data after binarization.

FIG. 3 is a graph of a time series features/analysis.

FIGS. 4A-4C are graphs illustrating message volume over time.

DETAILED DESCRIPTION OF SPECIFIC EMBODIMENTS

Figure 1:
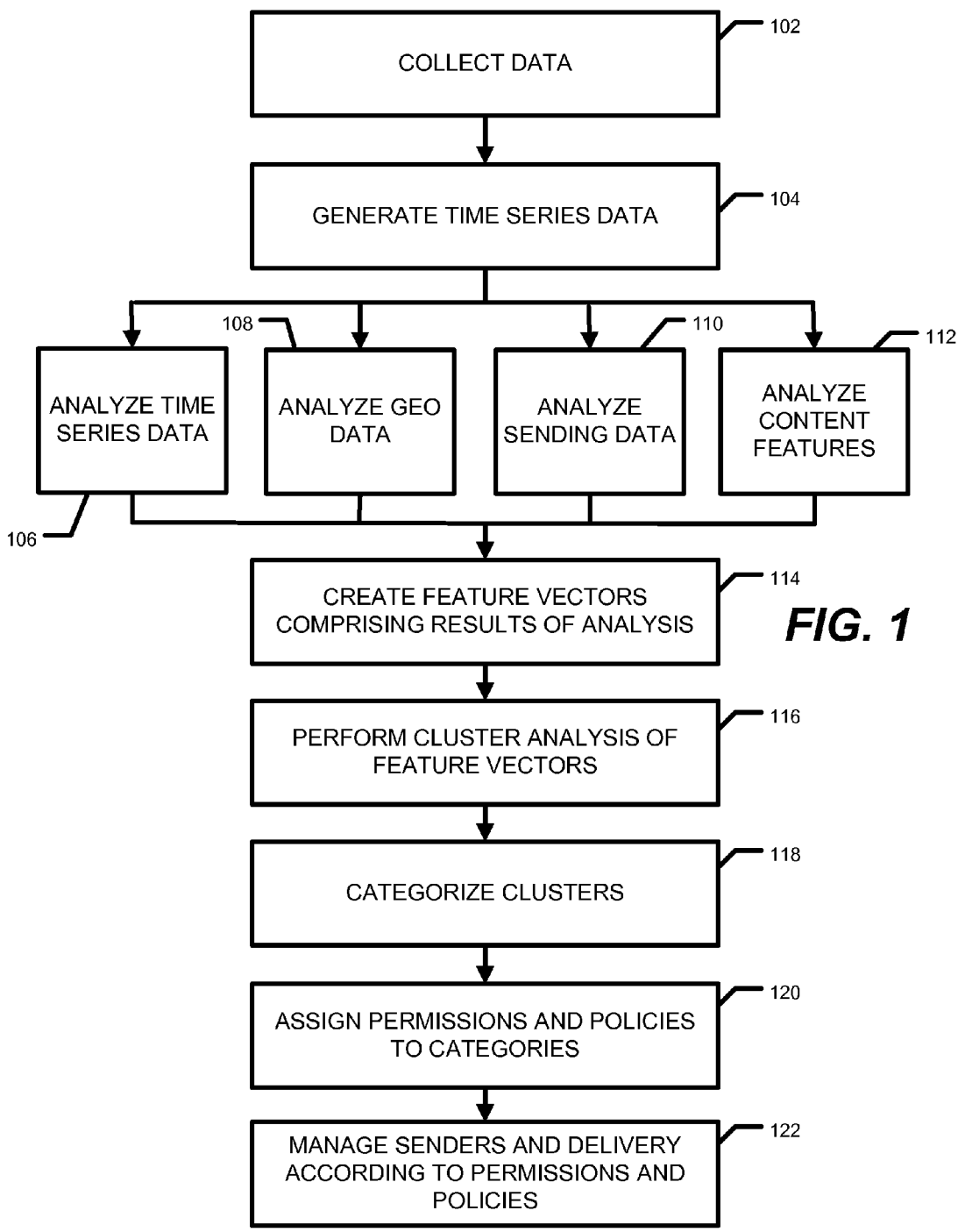
FIG. 1 illustrates a method of classifying and managing email traffic according to an embodiment of the invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

More than 75% of all email traffic on the internet is spam. To date, spam-blocking efforts have taken two main approaches: (1) content-based filtering and (2) IP-based blacklisting. Both of these techniques are losing their potency as spammers become more agile. Spammers evade IP-based blacklists with nimble use of the IP address space such as stealing IP addresses on the same local network. To make matters worse, as most spam is now being launched by bots, spammers can send a large volume of spam in aggregate while only sending a small volume of spam to any single domain from a given IP address. The "low" and "slow" spam sending pattern and the ease with which spammers can quickly change the IP addresses from which they are sending spam has rendered today's methods of blacklisting spamming IP addresses less effective than they once were.

Two characteristics make it difficult for conventional blacklists to keep pace with spammers' dynamism. Firstly, existing classification is based on non-persistent identifiers. An IP address doesn't suffice as a persistent identifier for a host: many hosts obtain IP addresses from dynamic address pools, which can cause aliasing both of hosts and of IP addresses. Malicious hosts can steal IP addresses and still complete TCP connections, allowing spammers another layer of dynamism. Secondly, information about email-sending behavior is compartmentalized by limited features such as volume and spam-and-non-spam ratio. Today, a large fraction of spam comes from botnets, large groups of compromised machines controlled by a single entity. With a much larger group of machines at their disposal, spammers now disperse their jobs so that each IP address sends spam at a low rate to any single domain. By doing so, spammers can remain below the radar, since no single domain may deem any single spamming IP address as suspicious.

To keep pace with this dynamism, embodiments of the invention incorporate multi-feature classification, which complements existing techniques by categorizing spammers based on how they send email, rather than solely or primarily by the IP address from which they are sending it. One prior technique utilizes a classification system is referred to as WGN (White-Grey-None). In this system, white is a classification of well known good senders and mail from such senders is routed to the inbox, whereas grey is a classification of senders known to generate spam and mail from such senders is routed to the spam or bulk folder. None is a classification used to designate mail from email providers where a designation cannot be determined because of the anonymous nature of the provider, for example, mail that originates from hotmail or gmail etc. Black is another classification of the WGN scheme that designates that no connection at all is allowed to certain entities.

The multi feature classification provides a more complete picture and more effective and tailored system for spam detection and limitation, and in some cases may replace a prior technique while in other scenarios it may be used in conjunction with and complement existing techniques.

In certain embodiments, once email sending patterns that are characteristic of spamming behavior are identified, an email system can continue to use an IP address as a basis of blocking spam even as spammers change IP addresses.

FIG. 1 illustrates a method of classifying and managing email traffic according to an embodiment of the invention. In step 102 the email system collects data on email traffic. The data comprises the volume of email traffic in a given period, information related to the sender, receiver, and content, etc. as will be discussed in more detail below. Then in step 104 the system will generate time series data. This involves dividing the traffic into discrete time periods and data filtering such as noise removal. For example, the data can be processed and analyzed in 15 minute intervals.

In steps 106-112 features of the (email) data are analyzed and extracted. More specifically, in step 106, time series features are analyzed/extracted. This may involve computing moving averages, standards, means, performing fast fourier transform ("FFT") analysis, performing discrete wavelength transforms ("DWT"), binary representation, and other processing, for example. Time series features comprise: the statistics of a moving average (mean, std, entropy), FFT/DWT of time series, and binary representation.

For example, FIG. 2A shows a graph 202A of volume over time. The same data in graph 202A is shown in graph 202B of FIG. 2B as a smoothed time series after a moving average has been computed. In this example, the moving average is computed over ten minute windows. While the windows may of course be of any size range, a 5-15 minute window is preferred. FIG. 2C shows another example of volume over time in graph 204A whereas graph 204B of FIG. 2D shows the same data after binarization. The data in graphs 202A and 202B, represents traffic from a first IP address whereas that in graph 204A and 204B represents traffic from a second IP address.

As mentioned earlier, transforms such as FFT or DWT may also be performed. An example of this is shown in FIGS. 3A-3C. In graph 302 of FIG. 3A the time series 310 is shown along with its FFT approximation 312. The time series features extracted in step 106 are used as the basis of a time series feature vector. One exemplary time series vector comprises data indicative of: (1) Moving average; (2) mean; (3) std; (4) FFT; and (5) binary representation. FIGS. 4A-4C show message volume over time. Graph 400A illustrates a raw time series, whereas graph 400B shows a moving average of the same data. Graph 400C shows the same data after an FFT has been performed.

In step 108, geographic data/features are analyzed and extracted. Geographic features may comprise: country; connection type; linespeed; routing type; carrier; domain; and subnet. An example including all feature types will be discussed to aid in understanding, and will be carried though the description below. It should in no way be of a limiting nature. In this example of data being analyzed, geographic features include:

IP Address: 91.121.21.125;
Country: FR;
Connection type: unknown;
Linespeed: unknown;
Asn: 16276;
Carrier: ovh;
Ip_routingtype: none
Domain: unknown A resulting vector of geographic features of this example would be: (FR,?,?,16276,ovh,?,?).

An example of routing types is shown in the following table.

| routing type | Meaning | country srt | state srt |
| --- | --- | --- | --- |
| Fixed | Broadband: Cable modem or DSL | | |
| AOL | AOL user | | Yes |
| Pop | Dial up into regional ISP | | Yes |
| Super POP | Dial up into a multi-state ISP | | Yes |
| Cache Proxy | Accelerator proxy or content distribution service | | Yes |
| Regional Proxy | Proxy funneling traffic from multiple states within a country | | Yes |
| Anonymizer | Anonymizer proxy | Yes | Yes |
| Satellite | Consumer satellite or backbone satellite ISP | Yes | Yes |
| International Proxy | Proxy funneling international traffic | Yes | Yes |
| Mobile Gateway | Gateway connecting mobile devices to Internet. | Yes | Yes |
| Unknown | Cannot be identified | ? | ? |

In step 110, sending data/features are analyzed and extracted. Sending features may comprise information relating to: volume of sending, forwarding, replying, and the type and quantity of attachments.

One example of sending data/features is as follows:
Message size entropy: 0.3;
Spam vote/not spam vote: 0.2;
# of recipients: 581; and
# of attachments: 238.

The sending feature vector would then be as follows: (0.3, 0.2, 581, 238).

In step 112, content data/features are analyzed and extracted. Content features may comprise: message size/time period; MCU, URL, and spam votes/not spam votes.

One example of content features is as follows:

MCU: Viagra, Seix, etc;

URL: www.xxx12457.com etc;

tf/idf: 20, 3, 29, 48, 60, 4, 10, 57 etc;

In step 114 a feature vector comprising the extracted features/indications from the time series features, geographic features, sending features, and content features is created: (t1, t2, ... tm, g1, g2, ..., gn, s1, s2, ..., sp, c1, c2, ..., cq), wherein t1, t2, ... tm are time series feature or indications of same;

g1, g2, ..., gn are geo location features or indications of same;

s1, s2, ..., sp are sending features or indications of same; and c1, c2, ..., cq are content features or indications of same.

Such a feature vector is created for each user or group of interest, or alternatively for every user of the email system.

Then in steps 116 and 118 the system performs cluster analysis and categorization of the feature vectors for a group of some or all users. The cluster analysis involves analyzing the Euclidean distribution between feature vectors. A principal component analysis ("PCA") is preferably utilized, although all components may be analyzed. For example, a select group of 5-10 principal components may be analyzed. Other analysis techniques may be utilized such as expectation maximization ("EM"). EM is slower than K-Means, but in some situations produces more optimal clustering. The clustering may comprise K-means, density based spatial clustering of applications with noise ("DBSCAN"), or other suitable clustering techniques. DBSCAN is based on two main concepts: density reachability and density connectability, which depend on two input parameters of the DBSCAN clustering: the size of epsilon neighborhood e and the minimum points in a cluster. The K-means technique is based on an algorithm to cluster n objects based on attributes into k partitions, k<n. It is similar to the expectation-maximization algorithm for mixtures of Gaussians in that they both attempt to find the centers of natural clusters in the data.

Figure 5:
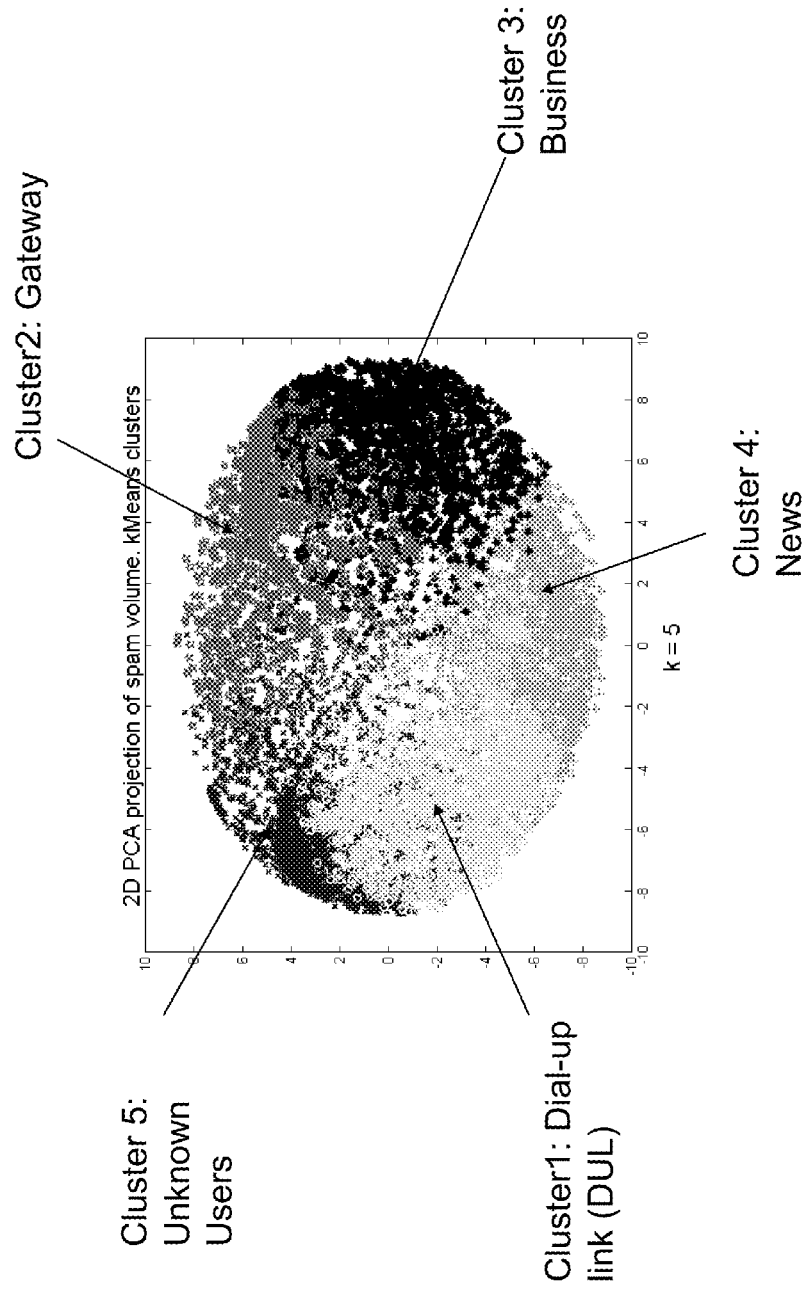
FIG. 5 illustrates K-means clustering with a 2D PCA projection of spam volume.

FIG. 5 illustrates K-means clustering with a 2D PCA projection of spam volume. In the example shown in FIG. 5, a number of clusters are identifiable: cluster 1 of mail from dial-up link users/connections; cluster 2 of mail from gateway users/connections; cluster 3 of mail from business users/connections; cluster 4 of mail comprising news related messages; and cluster 5 of mail from unknown users.

In step 120, identified or identifiable clusters are assigned permissions and policies relating to the volume of email they can send. The policies and permissions may be static or may allow for an initial volume or frequency and subsequent changes in volume or frequency once certain thresholds or criteria are met. In step 122, email senders and mail traffic is managed according to the policies and permissions assigned in step 120.

Figure 6:
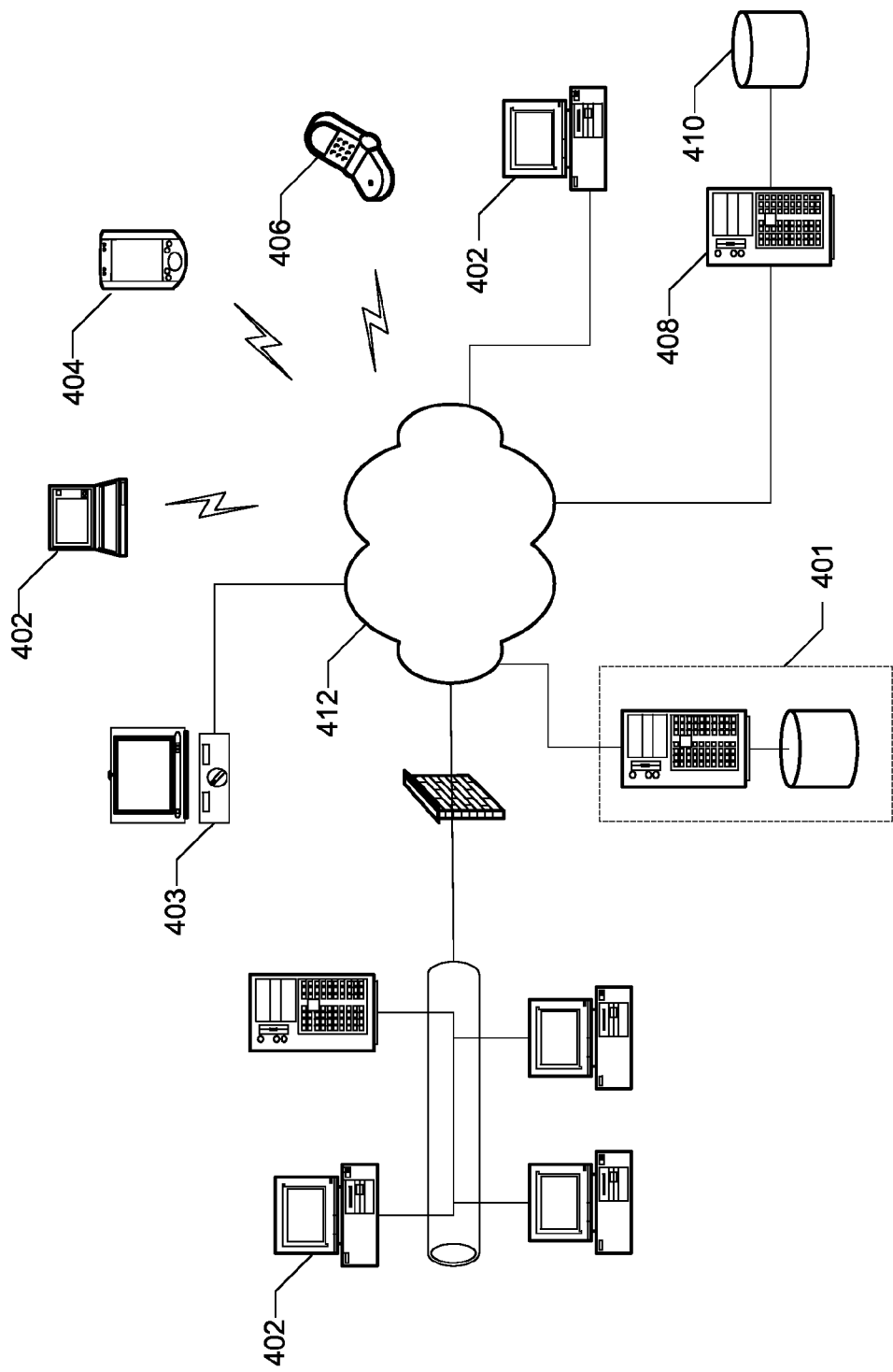
FIG. 6 is a simplified diagram of a computing environment in which embodiments of the invention may be implemented.

FIG. 6 is a simplified diagram of a computing environment in which embodiments of the invention may be implemented.

For example, as illustrated in the diagram of FIG. 6, implementations are contemplated in which a population of users interacts with a diverse network environment, using email services, via any type of computer (e.g., desktop, laptop, tablet, etc.) 402, media computing platforms 403 (e.g., cable and satellite set top boxes and digital video recorders), mobile computing devices (e.g., PDAs) 404, cell phones 406, or any other type of computing or communication platform. The population of users might include, for example, users of online search services such as those provided by Yahoo! Inc. (represented by computing device and associated data store 401).

Email traffic may be processed in accordance with an embodiment of the invention in some centralized manner. This is represented in FIG. 6 by server 408 and data store 410 which, as will be understood, may correspond to multiple distributed devices and data stores. The invention may also be practiced in a wide variety of network environments including, for example, TCP/IP-based networks, telecommunications networks, wireless networks, public networks, private networks, various combinations of these, etc. Such networks, as well as the potentially distributed nature of some implementations, are represented by network 412.

In addition, the computer program instructions with which embodiments of the invention are implemented may be stored in any type of tangible computer-readable media, and may be executed according to a variety of computing models including a client/server model, a peer-to-peer model, on a stand-alone computing device, or according to a distributed computing model in which various of the functionalities described herein may be effected or employed at different locations.

The above described embodiments have several advantages. They are adaptive and can dynamically track the algorithmic improvements made by spammers. Even low entropy spam generators can be detected and more readily stopped or limited. Spammers can be tracked by cluster characteristics rather than primarily by IP address. Thus, if a spammer's IP address changes, he can be tracked and limited at the new IP address, despite the change of IP address. This is advantageous given the increased ability to easily and dynamically change IP addresses, and to use aliased or otherwise cloaked IP addresses.

While the invention has been particularly shown and described with reference to specific embodiments thereof, it will be understood by those skilled in the art that changes in the form and details of the disclosed embodiments may be made without departing from the spirit or scope of the invention In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for managing email users and email traffic of an email system, comprising:

collecting usage data of email traffic handled by the email system;

generating time series data from the collected usage data;

analyzing the time series data;

analyzing geographic data of the usage data;

analyzing sending data of the usage data, the sending data comprising information related to the senders of the email traffic;

analyzing content features of the email traffic;

creating a plurality of feature vectors comprising indications of: the analyzed time series data, analyzed geographic data, analyzed sending data, and analyzed content features, the feature vectors including a first vector comprising an indication of a first feature and a second vector comprising an indication of a second feature; and performing cluster analysis on the plurality of feature vectors and clustering groups of vectors into a plurality of categories, the categories comprising a first clustered group of users corresponding to a first natural cluster in the usage data and a second clustered group of users corresponding to a second natural cluster in the usage data, the first clustered group comprising at least one first user associated with the first feature, the first feature corresponding to a center of the first clustered group, the second clustered group comprising at least one second user associated with the second feature, and the second feature corresponding to a center of the second clustered group.

2. The method of claim 1, further comprising:
assigning one or more email delivery thresholds to at least one categorized cluster group.

3. The method of claim 1, wherein analyzing time series data comprises performing a fast fourier transform of the email traffic.

4. The method of claim 1, wherein analyzing time series data comprises performing a discrete wavelength transform of the email traffic.

5. A computer-implemented method for managing email users and email traffic of an email system, comprising:
collecting usage data of individual and aggregate usage of the email system;
generating time series data from the collected data;
analyzing the time series data;
analyzing geographic data of the individual and aggregate usage;
analyzing sending data of the individual and aggregate usage;
analyzing content features of the individual and aggregate usage;
creating a plurality of feature vectors comprising indications of: the analyzed time series data, analyzed geographic data; and analyzed content features;
performing cluster analysis on the plurality of feature vectors and clustering groups of vectors into categories;
assigning a set of permissions and policies to each of the categories of clustered groups, wherein each category is assigned a set of permissions and policies and wherein there are two or more sets of permissions and policies; and
applying a first set of permissions and policies to a first clustered group of users and applying a second set of permissions and policies to a second clustered group of users.

6. The method of claim 5, wherein analyzing time series data comprise performing a fast fourier transform of incoming email traffic.

7. The method of claim 5, wherein analyzing time series data comprise performing a discrete wavelength transform of incoming email traffic.

8. The method of claim 5, wherein analyzing geographic data comprises analyzing a location associated with incoming mail, and one or more of: a connection type, a routing type, a domain, and a subnet.

9. The method of claim 5, wherein analyzing sending data comprises analyzing message size entropy.

10. The method of claim 5, wherein analyzing sending data comprises analyzing user classification history of a message as spam.

11. The method of claim 5, wherein analyzing sending data comprises analyzing the number of recipients of a message.

12. The method of claim 5, wherein analyzing sending data comprises analyzing the number of file attachments to a message.

13. The method of claim 5, wherein analyzing content features comprises determining or computing one or more of: most commonly used terms within the email; a URL within the email; and a term frequency or inverse term frequency computation result.

14. The method of claim 5, wherein assigning a set of permissions and policies to each of the categories of clustered groups comprises assigning one or more thresholds for maximum send volume per time period.

15. An email delivery and management system, configured to:
collect usage data of email traffic handled by the email system;
generate time series data from the collected usage data;
analyze the time series data;
analyze geographic data of the usage data;
analyze sending data of the usage data, the sending data comprising information related to the senders of the email traffic;
analyze content features of the email traffic;
create a plurality of feature vectors comprising indications of: the analyzed time series data, analyzed geographic data, analyzed sending data, and analyzed content features; the feature vectors including a first vector comprising an indication of a first feature and a second vector comprising an indication of a second feature; and
perform cluster analysis on the plurality of feature vectors and cluster groups of vectors into a plurality of categories,
the categories comprising a first clustered group of users corresponding to a first natural cluster in the usage data and a second clustered group of users corresponding to a second natural cluster in the usage data, the first clustered group comprising at least one first user associated with the first feature, the first feature corresponding to a center of the first clustered group, the second clustered group comprising at least one second user associated with the second feature, and the second feature corresponding to a center of the second clustered group.

16. The system of claim 15, wherein the system is further configured to:
assign one or more email delivery thresholds to at least one categorized cluster group.

17. The system of claim 15, wherein to analyze time series data the system is configured to perform a fast fourier transform of the email traffic.

18. The system of claim 15, wherein to analyze time series data the system is configured to perform a discrete wavelength transform of the email traffic.

19. The system of claim 15, wherein to analyze geographic data the system is configured to determine a location associated with incoming mail, and one or more of: a connection type, a routing type, a domain, and a subnet.

20. The system of claim 15, wherein to analyze sending data the system is configured to calculate message size entropy.

21. The system of claim 15, wherein to analyze sending data the system is configured to analyze a user classification history of a message as spam.

22. The system of claim 15, wherein to analyze sending data the system is configured to determine the number of recipients of a message.

23. The system of claim 15, wherein to analyze sending data the system is configured to analyze the number of file attachments to a message.

24. The system of claim 15, wherein to analyze content features the system is configured to determine one or more of: most commonly used terms within the email; a URL associated with the email; and a term frequency or inverse term frequency computation result.

* * * * *